United States Patent [19]

Taniyama

[11] Patent Number: 5,429,492
[45] Date of Patent: Jul. 4, 1995

[54] PLASTIC MOLDING APPARATUS

[76] Inventor: Yoshihiko Taniyama, 9380 Old Southwick Pass, Fulton County, Alpharetta, Ga. 30202

[21] Appl. No.: 995,806

[22] Filed: Dec. 23, 1992

[51] Int. Cl.⁶ .................. B29C 45/23; B29C 45/40
[52] U.S. Cl. .................... 425/556; 264/334; 425/444; 425/564; 425/566
[58] Field of Search ............... 425/556, 444, 566, 564; 249/67, 68; 264/334

[56] References Cited

U.S. PATENT DOCUMENTS

| | | | |
|---|---|---|---|
| 2,571,766 | 10/1951 | Saulino | 425/566 |
| 2,671,933 | 3/1954 | Mye | 425/556 |
| 3,161,918 | 12/1964 | Zcarbaugh | 425/566 |
| 3,671,159 | 6/1972 | Greenberg et al. | 425/556 |
| 3,672,807 | 6/1972 | Genz | 425/556 |
| 3,732,055 | 5/1973 | Hujik | 425/444 |
| 3,914,086 | 10/1975 | Hujik | 425/444 |
| 4,013,391 | 3/1977 | Boden et al. | 425/444 |
| 4,647,274 | 3/1987 | Oda | 425/556 |
| 4,655,274 | 4/1987 | Dannoura | 425/556 |
| 4,973,239 | 11/1990 | Hessmann et al. | 425/556 |
| 5,074,779 | 12/1991 | Tsutsumi et al. | 425/556 |
| 5,256,364 | 10/1993 | Herbst | 425/444 |

FOREIGN PATENT DOCUMENTS 1742084  6/1992  U.S.S.R. .................. 425/556

*Primary Examiner*—Khanh Nguyen
*Attorney, Agent, or Firm*—Troutman Sanders; Joel S. Goldman; John A. Savio, III

[57] ABSTRACT

A molding apparatus for plastic parts which includes a stationary core plate and a moveable cavity plate used to form a mold cavity, and an ejector plate with pins utilized to eject the molded part from the apparatus. The valve used to inject the liquid plastic, which may be coupled to the core plate or the cavity plate, is always located on the same side of the plastic part as the ejector plate.

5 Claims, 4 Drawing Sheets

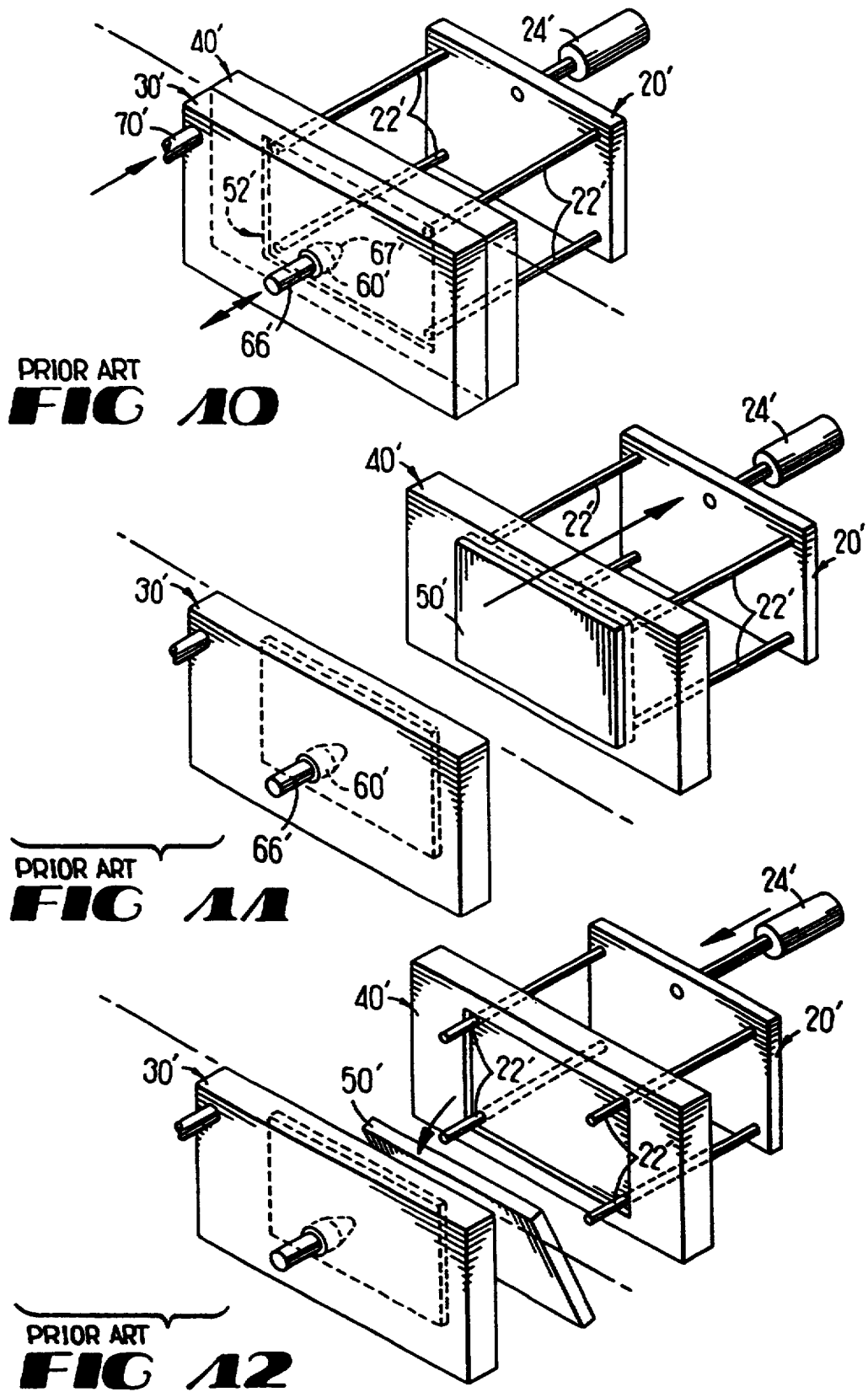

PLASTIC MOLDING APPARATUS

BACKGROUND OF THE INVENTION

1. Field Of Invention

This invention relates to an apparatus for molding plastic objects. More specifically, this invention relates to an apparatus for molding plastic parts, in which the means for ejecting the finished part from a cavity mold are positioned on the same side of the mold as the parts for injecting liquid plastic. This allows one side of the finished plastic part to remain completely unblemished by the molding process.

2. Description of the Prior Art

It is common to mold parts for plastic objects (e.g. plastic containers and mini-disk cartridge shells) using an apparatus incorporating a number of metal plates. As shown in FIGS. 10-12, such an apparatus may include a core plate 30', a cavity plate 40' and an ejector plate 20'. Carved out areas in the interiors of the core plate and the cavity plate form the cavity of the mold when these are mated. The ejector plate is usually positioned behind the cavity plate. A plurality of ejector pins 22' extend outwardly from the ejector plate and pass through holes in the cavity plate. Thus when the ejector plate is moved forward the ejection pins are urged against any newly molded part in the cavity plate, thereby forcing the part out of the cavity plate. Thus, when the ejector plate is moved forward, the ejector pins are urged against any newly molded part in the cavity plate thereby forcing the part out of the cavity plate.

Typically, plastic is injected from a line 70' coming from an injection unit into the mold through one or more openings in the core plate. The flow of liquid plastic material may be controlled by a valve 60' having a nozzle 62' and a needle 64' within the nozzle. The movement of the needle in to and out of the valve opening controls the flow of liquid plastic into the mold's cavity 52'. Movement of the needle may be controlled, for example, by a small hydraulic or air valve cylinder 66'. When the end 65' of the needle 64' is flush with the tip 67' of the nozzle 62', the valve 60' is closed (See FIG. 7). As shown in FIG. 10, when the cylinder 66' retracts the needle 64' the valve 60' is opened (See FIG. 8) and liquid plastic material is allowed to enter the cavity of the mold 52'. After the cavity 52' has been filled, the valve cylinder 66' pushes the needle 64' forward to the closed position (See FIG. 7), such that the end 65' of the needle 64' is again flush with the tip 67' of the nozzle 62'.

A prior art method of removing finished parts from a mold is shown in FIGS. 11 and 12. After the plastic material has partially cooled, the cavity plate 40' and the ejector plate 20' both move in tandem away from the core plate 30', which remains stationary. This causes the molded plastic part 50' to be removed from the core plate 30'. Finally, as shown in FIG. 12, a hydraulic or air cylinder 24' pushes the ejector plate 20' forward such that all of the ejector pins 22' simultaneously dislodge the molded plastic object 50' from the cavity plate 40'. This sequence of events may be repeated for the next plastic object 50'. Unfortunately, the movement of the ejector pins against the partially cooled plastic part usually results in a blemish being produced at the point of contact. This blemish is on the part's opposite side, which has received a blemish produced by the injector nozzle.

Most plastic parts have an appearance side, usually the front side, in which a label or some other form of identification is placed. In present molding processes, as described above, blemishes are left on this appearance side by either the valve or the ejector pins. Manufacturers of these parts have, therefore, typically placed paper labels over the appearance side surface as a means of identifying the object and as a means of covering the blemishes. However, due to the increased use of silk screening on plastic objects, a need exists for a plastic object with an appearance side surface which remains unblemished during the molding process such that, for example, a substantial portion of the appearance side surface may be silk screened. Though silk screening is a significant reason for needing an unblemished surface, this is only one of many other purposes in which an unmarked plastic surface may be utilized.

A problem which has prevented present molds from being constructed with injection valves on the same side of the mold as the ejector pins is that ejector pins must be evenly distributed across the entire surface of the finished plastic part so as to apply evenly distributed pressure across an entire surface of the part. This is necessary to prevent warpage of the part upon removal from the mold. However, because the valve nozzle or nozzles often occupy a substantial amount of space, there has previously been no device or method for positioning the ejector pins on the same side of the mold as the valve nozzle which allows proper spacing of the pins to prevent warpage of the plastic part upon its removal from the mold's cavity.

SUMMARY OF THE INVENTION

It has previously been established that a need exists for a molding device for plastic parts which will leave the appearance side surface of the part unmarked during and after the molding process while at the same time avoiding warpage of the part during removal from the mold. This and other objectives are achieved by the molding apparatus of the present invention by positioning the injection valve and the ejector pins on one side of the mold so that only the non-appearance side of the part produced by the mold has blemishes caused by the operation of the injector valve and ejector pins. This is made feasible by utilizing the needle within the valve nozzle as an additional ejector pin.

In a first preferred embodiment, the molding device includes three plates: a core plate, a cavity plate, and an ejector plate. The core plate and the cavity plate have carved out areas in their interior, which are mated together to form the mold's cavity. However, unlike conventional plastic molding devices, the ejector plate is positioned on the side of the core plate opposite the cavity plate. In this embodiment, the core plate, not the cavity plate, has holes or apertures in its side wall which are evenly distributed and the carved out area side wall of the cavity plate should be smooth and/or have a clean finish. The ejector pins extending perpendicularly from the ejector plate's surface are positioned such that each is aligned with a corresponding hole in the core plate. The ends of the injector pins remain flush with the surface of the core plate until the ejector pins are activated to eject the plastic part.

An injection unit which injects the mold material into the cavity of the mold is connected to the core plate with a valve having a nozzle on its end. A needle controlled by a small hydraulic or air cylinder extends through the valve and into the nozzle.

In accordance with the present invention, the needle serves two purposes. First, the needle performs its conventional function by being utilized to control the flow of liquid plastic material into the cavity of the mold. When the small cylinder pushes the end of the needle flush with the tip of the nozzle, the valve is closed. On the other hand, when the needle is retracted into the nozzle by the small cylinder, the valve is opened. When the valve is open, liquid plastic material is allowed to flow from the injection unit through the valve and into the mold's cavity. Second, the needle is also employed as an ejector pin by being coupled to the ejection plate so that it may be pushed past the flush point of the nozzle's tip during the process of ejecting the finished plastic part.

When the plastic material has partially cooled, the cavity plate moves away from the stationary core plate to remove the finished plastic part from the cavity plate. Finally, a larger hydraulic or air cylinder is utilized to push the ejector plate forward so that both the needle and the ejector pins move into the holes in the core plate's side walls simultaneously, thereby dislodging the plastic part from the core plate.

Since the valve nozzle and ejector pins are positioned on the core plate side of the plastic part, which may be referred to as the "non-appearance side" or "back side," the other side of the plastic part, the "appearance side" or "front side", is molded without any marks. Therefore, the entire surface of the appearance side may be silk screened.

In a second preferred embodiment, the molding device utilizes the same components. However, for this embodiment the core plate, the cavity plate, and the ejector plate are positioned in their conventional configuration, with the cavity plate positioned in between the core plate and the ejector plate. In this embodiment, the cavity plate, rather than the core plate, has the holes in its side wall to accept the ejector pins, and the carved out area side wall of the core plate should be smooth and/or have a clean finish. The ejector pins still extend perpendicularly from the ejector plate surface, however, now they remain flush with corresponding holes in the cavity plate.

The injection unit is now connected to the cavity plate with the valve nozzle. The needle extending through the valve continues to serve the same to functions as it did in the first preferred embodiment. It is utilized to open and close the valve to control the injection of liquid plastic material into the cavity, and it is employed as an ejector pin by attaching it to the ejector plate.

For this embodiment, after the liquid plastic material has been injected into the cavity, it should be allowed to cool slightly. When the plastic material has solidified but is still warm, the cavity plate and the ejector plate are moved away from the stationary core plate, thereby causing the plastic part to be removed from the core plate. Finally, the larger hydraulic or air cylinder pushes the ejector plate so that the ejector pins and the needle move into the cavity plate holes, thereby dislodging the plastic part from the cavity plate.

Similar to the first preferred embodiment, since the valve nozzle and ejector pins are all on the cavity plate side, this embodiment allows the appearance side of the plastic part to be molded without blemishes. Therefore, silk screening may be applied over the entire surface of the appearance side surface.

Additional ejector pins may also be positioned through the collar of the valve nozzle. This may prove to be significant in the situation where more pressure points are needed to dislodge the plastic object from the core plate or cavity plate in the first or second preferred embodiment respectively.

BRIEF DESCRIPTION OF THE DRAWINGS

The accompanying drawings are preferred but nevertheless illustrative embodiments of the invention, which serve to aid in the explanation of the principles of the invention.

FIG. 10 is a perspective view of a prior art molding device for plastic objects with the core plate and the cavity plate mated together, with the valve mounted to the core plate, and with the ejector plate's pins mated flush with the cavity plate's side wall.

FIG. 11 is a perspective view of a prior art molding device for plastic objects with the ejector plate's pins mated flush with the cavity plate's side wall after the cavity plate and ejector plate have moved in tandem away from the core plate keeping the plastic object lodged in the cavity plate.

FIG. 12 is a perspective view of a prior art molding device for plastic objects with the ejector plate's pins extending through the apertures in the cavity plate's side wall to dislodge the plastic object.

DETAILED DESCRIPTION OF ILLUSTRATIVE EMBODIMENT

Figure 1:
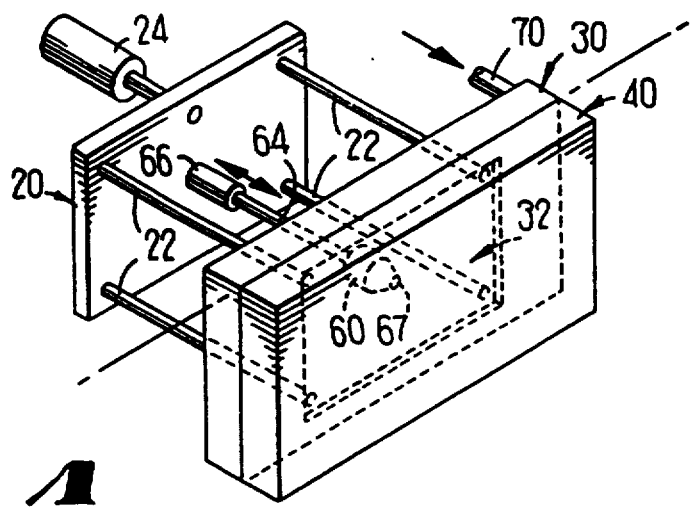
FIG. 1 is a perspective view of the core plate and cavity plate mated together with the valve mounted to the core plate and the ejector plate's pins mated flush with the core plate's side wall.
Figure 2:
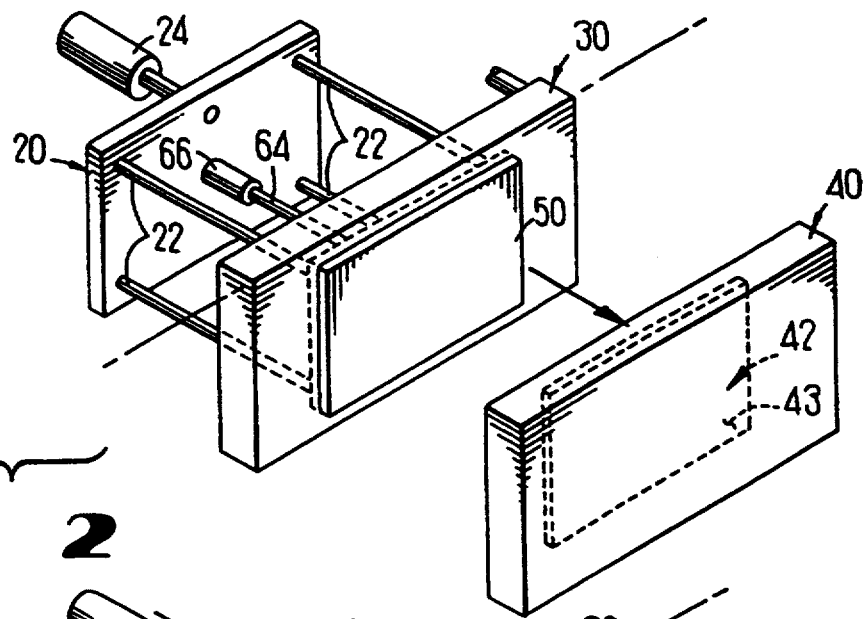
FIG. 2 is a perspective view of the ejector plate's pins mated flush with the core plate's side wall after the cavity plate has moved away from the core plate leaving the plastic object lodged in the core plate.
Figure 3:
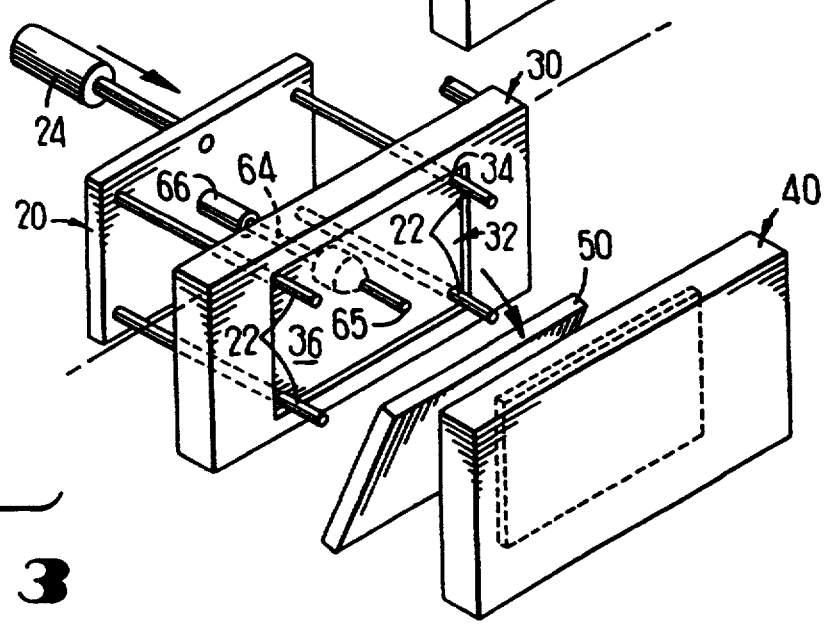
FIG. 3 is a perspective view of the ejector plate's pins extending through the apertures in the core plate's side wall to dislodge the plastic object.

Referring to FIGS. 1-3, a first preferred but nevertheless illustrative embodiment of the molding device includes a core plate 30, a cavity plate 40, and an ejector plate 20. Preferably, each plate is formed of steel, such as stainless steel, although other similar types of material may be employed.

The core plate 30 is mounted such that it remains stationary during the molding process. A carved out area 32 in the form of the part 50 to be produced is formed into the interior of the core plate 30. The core plate 30 also has a plurality of evenly distributed holes 34, which are preferably very small. The holes 34 are formed in the side wall 36 of the core plate 30, and are evenly positioned to assure that equal pressure is applied to the part 50 upon its ejection from the mold to ensure that the surfaces of the part 50 will not be warped during ejection.

The nozzle 62 of a valve 60 extending from a mold injection unit (not shown) via line or tube 70 is also mounted to the core plate 30. The valve 60, which preferably includes a heater, has a needle 64 extending through it such that the movement of the needle 64 controls the injection of the liquid plastic material. A valve cylinder 66 is coupled to the needle 64 to control the movement of the needle 64 during the liquid plastic material disbursement process. Preferably, an air or hydraulic cylinder should be employed, though other similar cylinders may be utilized. The needle 64 is also coupled to the ejector plate 20, which allows the needle 64 to be employed to help eject the object 50.

The cavity plate 40 is mounted so that it may move during the molding process. A carved out area 42 in the shape of the part 50 is formed in the interior of the cavity plate 40. The interior side wall 43 of the cavity plate 40 should be smooth and/or have a clean finish. The cavity plate 40 should be positioned next to the core plate 30 such that the carved out areas 32 and 42 of each plate 30 and 40 respectively may be mated.

The ejector plate 20 is positioned adjacent to the core plate 30 on the side opposite the cavity plate 40, and the ejector plate 20 is mounted so that it may move during the molding process. The ejector plate 20 has ejector pins 22 mounted to its surface. The ejector pins 22 extend perpendicularly along with the needle 64 from the valve 60 coupled to the ejector plate 20. The ejector pins 22 and needle 64 are positioned such that they may mate with the holes 34 in the side wall 36 of the core plate 30. Means for moving the ejector plate such as an ejector cylinder 24 are coupled to the ejector plate 20 to control it during the ejection process. Preferably an air or hydraulic cylinder should be utilized, though other similar cylinders may be employed.

Figure 7:
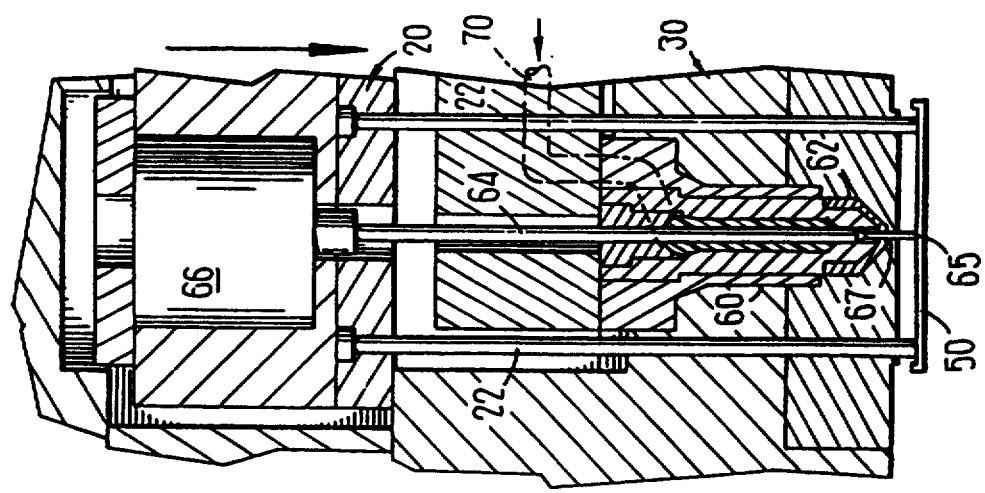
FIG. 7 is a cross-sectional view of the valve in the closed position with the end of the needle extending to the tip of the nozzle.
Figure 8:
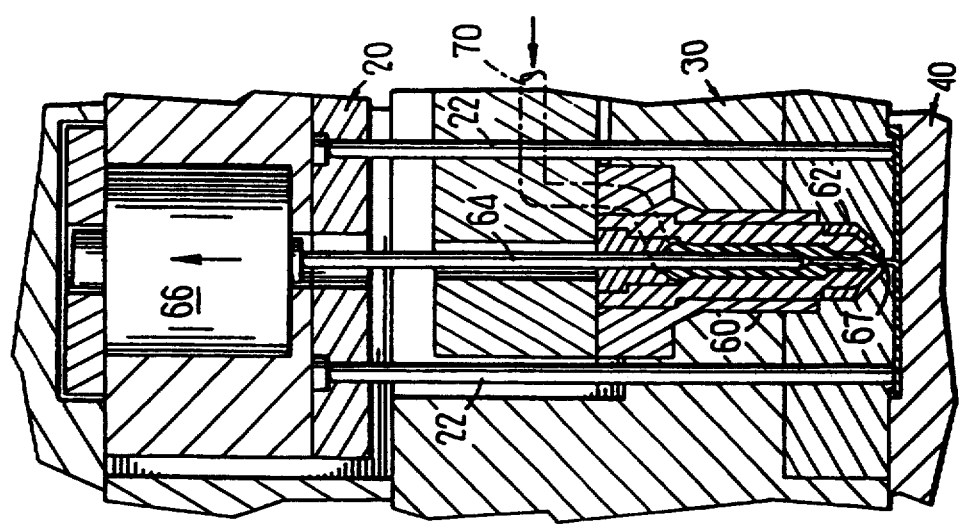
FIG. 8 is a cross-sectional view of the valve in the open position with the end of the needle retracted within the valve away from the tip of the nozzle.

As shown in FIG. 1, the core plate 30 and the cavity plate 40 are pressed together so that their carved out areas 32 and 42 respectively form the mold's cavity 52. The ejector pins 22, which extend from the ejector plate 20 are positioned so that they are mated, but flush, with the holes 34 in the side wall 36 of the core plate 30. The valve cylinder 66 retracts the needle 64 within the nozzle 62 of the valve 60 from its closed position to its open position (see FIG. 8), and liquid plastic mold material from the injection unit 70 is allowed to enter through the core plate 30 and fill the mold's cavity 52. When the mold's cavity 52 is full, the flow of mold material is cut off by the action of the valve cylinder 66 pushing the needle 64 through the nozzle 62 until the end 65 of the needle 64 is flush with the tip 67 of the nozzle 62 (see FIG. 7).

As shown in FIG. 2, once the mold material within the mold's cavity 52 has had an opportunity to harden and cool to a predetermined temperature, the cavity plate 40 is pulled away from the core plate 30 such that the molded part 50 is removed from the cavity plate 40.

Figure 9:
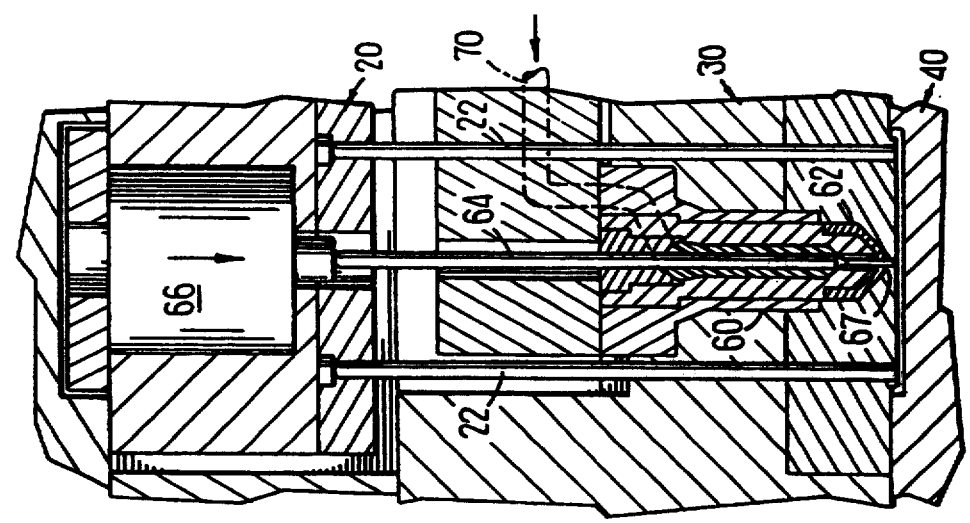
FIG. 9 is a cross-sectional view of the valve in the ejection position with the end of the needle extending through the valve and past the tip of the nozzle.

Finally, as shown in FIG. 3, the ejector cylinder 24 pushes the ejector plate 20 forward such that the ejector pins 22 and the needle 64, which now extends through the tip 67 of the nozzle 62, (see FIG. 9), simultaneously extend into the holes 34 in the side walls 36 of the core plate 30 until the molded part 50 is dislodged from the core plate 30.

In a second preferred illustrative embodiment (see FIGS. 4–6), the molding device may utilize the same components as described in the first preferred embodiment. However, for the second embodiment, the ejector plate 20 is positioned adjacent to the cavity plate 40 on the side opposite the core plate 30. Also, the side wall 33 of the carved out interior area 32 of the core plate 30 should be smooth and/or have a clean finish.

In this embodiment, the side wall 46 of the cavity plate 40, (not the side wall 36 of the core plate 30), has evenly distributed holes 44 which are aligned with the ejector pins 22 of the ejector plate for ejection purposes. Also, the nozzle 62 of the valve 60 extending from the injection unit 70 is now mounted to the cavity plate 40.

Figure 4:
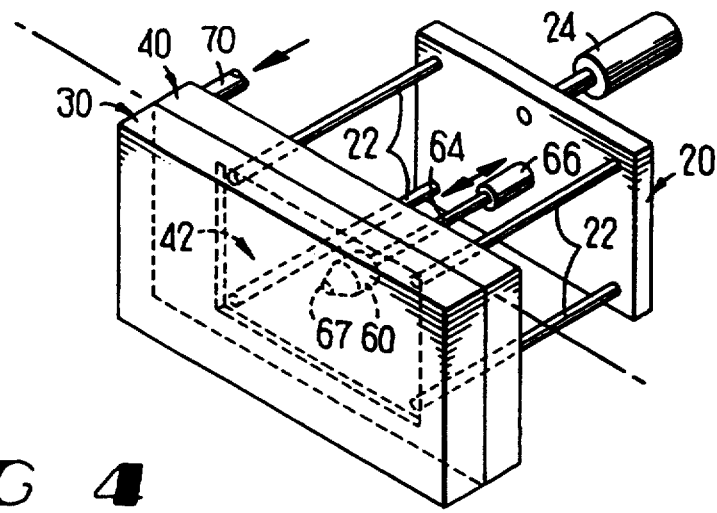
FIG. 4 is a perspective view of the core plate and cavity plate mated together with the valve mounted to the cavity plate and the ejector plate's pins mated flush with the cavity plate's side wall.

As shown in FIG. 4, the core plate 30 and the cavity plate 40 are pressed together so that their carved out areas 32 and 42 respectively form the mold's cavity 52. The ejector pins 22, which extend from the ejector plate 20, are positioned so that they are mated, but flush, with the holes 44 in the side wall 46 of the cavity plate 40. The valve cylinder 66 retracts the needle 64 within the nozzle 62 of the valve 60 from the closed position to the open position (see FIG. 8), and mold material from the injection unit 70 is allowed to flow into the mold's cavity 52 through the cavity plate 40. When the step of filling the mold's cavity 52 with liquid mold material is complete, the valve cylinder 66 shuts off the flow of the mold material by pushing the needle 64 back down the nozzle 62 until the end 65 of the needle 64 is flush with the tip 67 of the nozzle 62 (see FIG. 7).

Figure 5:
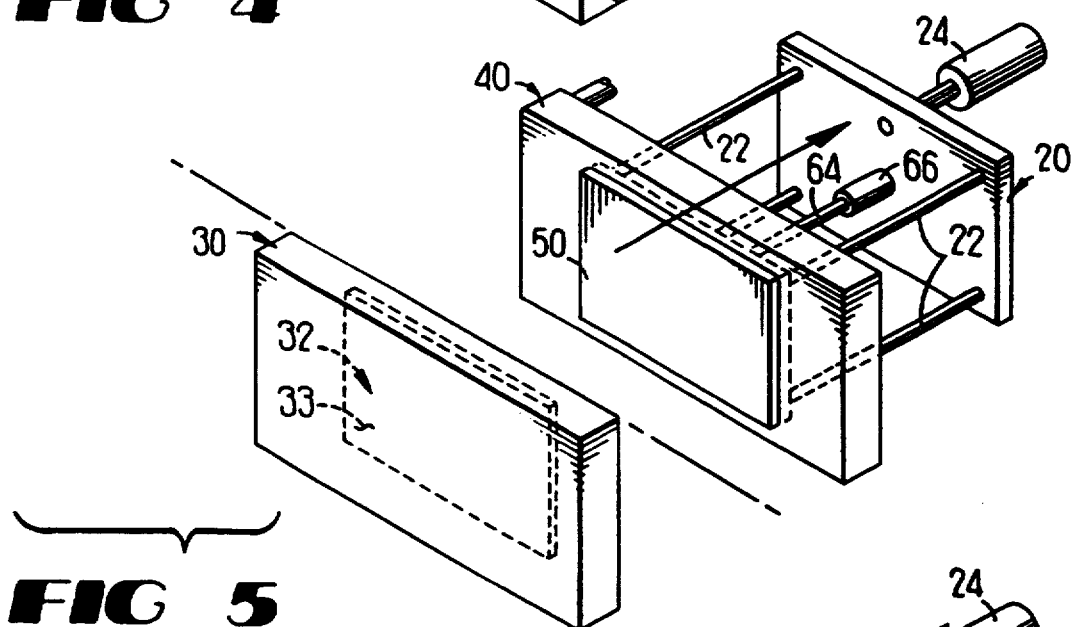
FIG. 5 is a perspective view of the ejector plate's pins mated flush with the cavity plate's side wall after the cavity plate and ejector plate have moved in tandem away from the core plate keeping the plastic object lodged in the cavity plate.

As shown in FIG. 5, once the mold material within the mold's cavity 52 begins to harden and cool to a predetermined temperature, the cavity plate 40 and the ejector plate 20 are pulled away from the core plate 30 in tandem such that the molded part 50 is removed from the core plate 30.

Figure 6:
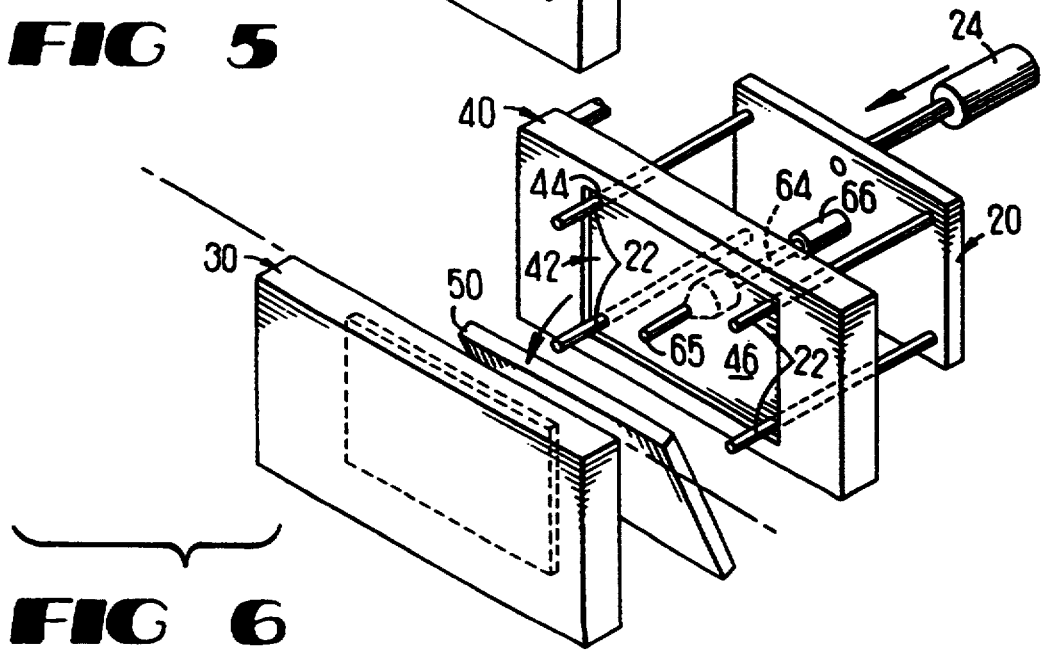
FIG.6 is a perspective view of the ejector plate's pins extending through the apertures in the cavity plate's side wall to dislodge the plastic object.

Finally, as shown in FIG. 6, the ejector cylinder 24 pushes the ejector plate 20 such that all of the ejector pins 22 as well as the needle 64, which now extends through the tip 67 of the nozzle 62, (see FIG. 9), are simultaneously pushed forward. Upon being pushed forward, the ejector pins 22 and the needle 64 should extend into the holes 34 in the side wall 46 of the cavity plate 40 until the molded object 50 becomes dislodged from the cavity plate.

In both embodiments, the finished molded part 50 should have a smooth unblemished "appearance" side surface. Therefore, the entire appearance side surface may have a silk screen applied to it. Also, in other embodiments, ejector pins 22 may be positioned through a collar located around the nozzle 62 of the valve 60.

I claim:

1. A plastic injection molding device including a cavity for molding at least one object having a front side and a back side, said device comprising:

at least one valve for controlling flow of mold material to said cavity including,
   a nozzle portion leading to the cavity, and
   a valve needle for controlling flow of said mold material through said nozzle portion into the cavity; an ejector plate having a plurality of ejector pins attached thereto and extending perpendicularly therefrom; first actuating means for reciprocating said valve needle relative to said ejector plate including, a first end fastened to said ejector plate, and a second end fastened to said valve needle such that said valve needle extends from said ejector plate; and second actuating means for actuating said ejector plate for moving said valve needle and said ejector pins in unison to eject said object from the cavity; wherein said valve needle and said ejector pins are positioned to make contact with only the back side of the object.

2. The device of claim 1, wherein the cavity includes a first plate having a carved out interior and a second plate having a carved out interior.

3. The device of claim 2, wherein said at least one valve nozzle is coupled to said first plate.

4. The device of claim 2, wherein said first plate further includes a plurality of apertures corresponding in shape and position to said plurality of ejector pins for accepting said plurality of ejector pins to eject said object, wherein at least one of said apertures corresponds in shape and position to said valve needle of said at least one valve for allowing said valve needle to extend through said first plate to eject said object.

5. The device of claim 1 wherein said first actuating means is a hydraulic cylinder and wherein said second actuating means is a hydraulic cylinder.

* * * * *